United States Patent [19]

Mariani

[11] Patent Number: 4,523,790
[45] Date of Patent: Jun. 18, 1985

[54] LIGHT WEIGHT WHEEL FORMED FROM SHEET METAL

[75] Inventor: Lauro Mariani, Livorno, Italy

[73] Assignee: Gilardini S.p.A., Turin, Italy

[21] Appl. No.: 374,740

[22] Filed: May 4, 1982

[30] Foreign Application Priority Data

May 6, 1981 [IT] Italy ............................... 67607 A/81
Mar. 25, 1982 [IT] Italy ............................. 53104/82[U]

[51] Int. Cl.³ .......................... B60B 3/04; B60B 3/10
[52] U.S. Cl. .................................. 301/64 SD; 301/66
[58] Field of Search .......... 301/63 R, 63 DT, 64 SH, 301/64 SD, 66, 79, 104; 29/159 R, 159.1

[56] References Cited

U.S. PATENT DOCUMENTS

| | | | |
|---|---|---|---|
| 1,084,875 | 1/1914 | Anderson | 301/63 DT |
| 1,320,999 | 11/1919 | Baker | 301/64 SH |
| 1,445,405 | 2/1923 | Mathias | 301/64 SD |
| 2,032,797 | 3/1936 | Eksergian | 301/64 SD |
| 2,047,137 | 7/1936 | Eksergian | 301/64 SD X |

Primary Examiner—David A. Scherbel
Attorney, Agent, or Firm—Gifford, VanOphem, Sheridan, Sprinkle & Nabozny

[57] ABSTRACT

A lightweight wheel for land vehicles, particularly bicycles and motorized cycles, which provides sufficient durability for use on rough terrain. The wheel includes a central hub, a peripheral rim which retains a tire, and a plurality of extensions which extend between the hub and rim. The wheel is constructed substantially from a single sheet of material pressed and cut to form the elements of the wheel.

10 Claims, 19 Drawing Figures

LIGHT WEIGHT WHEEL FORMED FROM SHEET METAL

BACKGROUND OF THE INVENTION

The present invention relates to a wheel for light vehicles, such as for example motor vehicles, and particularly, but not exclusively, to a wheel for motor-bicycles.

Various types of wheels for motor-bicycles are known, and all of them are of one the following models: spoked wheels, die-cast spoked wheels and plate wheels. The spoked wheels, similar to bicycle wheels, are supported by a hub and a rim made of plate which are joined to one another by means of a plurality of metal rods disposed radially in at least two series and oblique relative to the axis of rotation of the wheel and with an inclination in opposite directions to one another. The die-cast wheels are made in one piece, usualy of aluminum or light alloys. There have also been proposed wheels of this second type made of synthetic plastic resin. The wheels of this second type have a hub and a rim joined to one another by a variable number (usually three or four) of tapered spokes and are very similar, on the whole, to a spoked pulley. The wheels made of plate comprise two central members coupled to one another to define a hub and a plurality of spokes for the said wheel, formed by shearing and pressing from at least two separate sheets of plate, and an outer rim formed by pressing and rolling of a third sheet of plate. These three members are then joined to each other by riveting or by welding.

The types of wheels described hereinabove are not free from disadvantages. In particular, the spoked wheels are of economical construction but have a poor strength and require continuous maintenance and frequent substitution of the metal rods which, because of impacts, easily break and deform. The die-cast wheels made of aluminum or metal alloys are very widely used, have a high strength and do not require any maintenance but are more expensive and require expensive equipment for their manufacturing. The die-cast wheels made of plastics are lighter but are less reliable. Finally, the wheels made of plate usually are very heavy and have the disadvantage in that they are composed of three pieces which require expensive connection operations. In addition, they form excessive scrap.

SUMMARY OF THE INVENTION

The object of the present invention is to provide a wheel for light vehicles, and in particular for motor-bicycles, having a high strength and lightness, which will not require any maintenance and will be easy and economical to manufacture with a limited number of manufacturing operations. Moreover, the technical solution according to the present invention will allow a large freedom in styling. These objectives are achieved by the present invention which relates to a wheel for light vehicles, and in particular for motor-bicycles, comprising a hub member, a rim arranged to receive a tire, and a plurality of spokes arranged to rigidly connect said hub member to said rim, characterized in that said spokes are made in one piece with said hub member by shearing and bending a single annular disc substantially planar and coaxial to said hub element with which said disc is integral, said spokes comprising planar portions of said disc which are bent obliquely in opposite directions relative to the plane containing said disc and which diverge towards the axis of said wheel, said portions being delimited by cavities formed by shearing in said disc.

BRIEF DESCRIPTION OF THE DRAWINGS

For a better understanding of the present invention some embodiments thereof will now be described in detail with reference to the annexed drawings, in which.

DETAILED DESCRIPTION OF THE INVENTION

Figures 1, 3, 4:
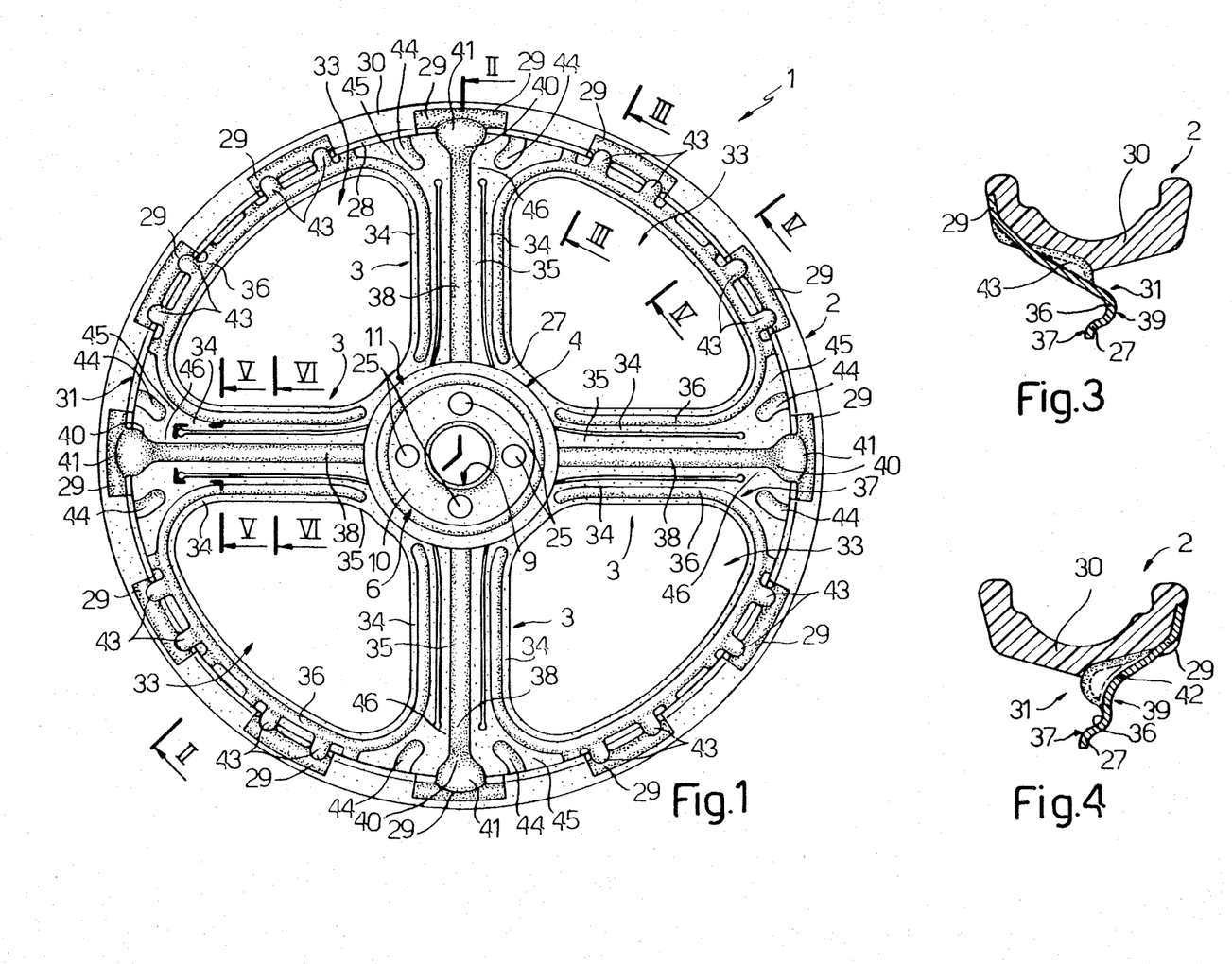
FIG. 1 is a plan view of a wheel according to the teachings of the present invention.
FIGS. 3, 4, 5 and 6 are sectional views along lines III—III, IV—IV, V—V and VI—VI, respectively, of the wheel of FIG. 1.
Figures 2, 5, 6, 7:
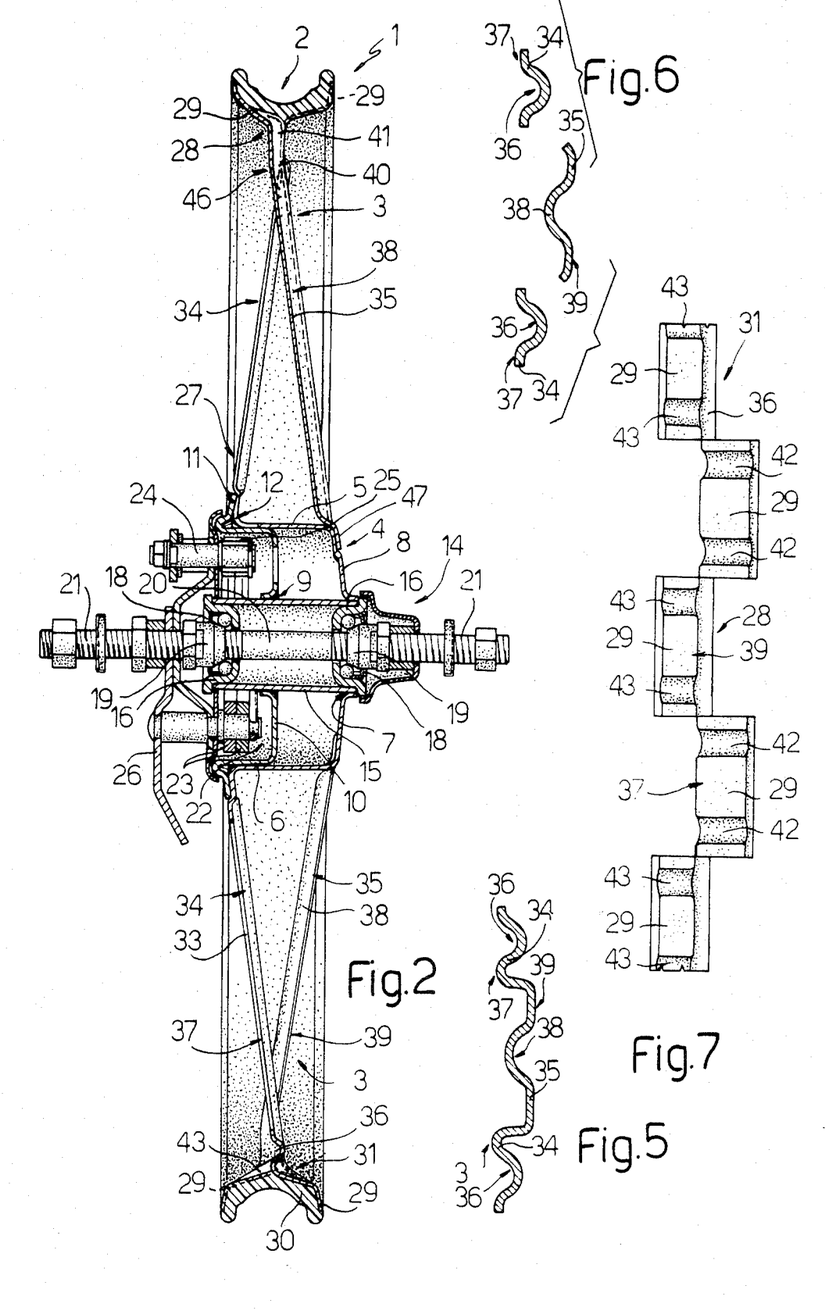
FIG. 2 is a sectional view along line II—II of FIG. 1, showing the wheel mounted on a front hub of a motor-bicycle.
FIG. 7 shows segmental portions of the circumference of the wheel shown in FIG. 1.

Referring now to FIGS. 1 and 2, reference numeral 1 indicates generally a wheel for motor-bicycles and for light vehicles, comprising a rim 2 arranged to house a tire with respective air tube (not shown), a series of spokes 3 and a central hub 4 rigidly connected to the rim 2 by the spokes 3. Hub 4 comprises two cup-shaped elements 5 and 6 engaged in a plug-like fashion one within the other. Element 5, which has a larger inner diameter and is deeper than the element 6, is made of sheared pressed plate in one piece with the spokes 3, is substantially cylindrical in shape, is coaxial with the rim 2 and has an axial bore 7 formed in a bottom wall 8. Element 6 is coaxial with the element 5, is arranged to couple with element 5 and has a bore 9 coaxial with the bore 7. Formed in a bottom wall 10 of the element 6 is a shaped annular edge 11 by means of which element 6 is rigidly connected to a similar edge 12 of the element 5 by means of a series of welding spots (not shown).

Referring now to FIG. 2, the hub 4 formed in the way described hereinabove serves to mount the wheel 1 on a front hub 14 of a motor-bicycle or another similar vehicle, not shown. Hub 14 is of a known type, so that its main elements only are briefly described herein. Housed within the bores 7 and 9 is a cylindrical plate sleeve 15 in which there are mounted the outer races 16 of ball rolling bearings 18 whose inner races 19 are screwed on a shaft 20 having threaded ends 21 to which the uprights (not shown) of the vehicle to which the wheel 1 pertains are fixable. Housed in a cavity 22 formed by the interior of the cup-shaped element 6 are shoes 23 of a brake 24 whose drum is formed by the element 6 itself. Bores 25 formed in the wall 10 and arranged in a crown-like fashion about the central bore 9 allow mounting the brake 24 which is provided also with a protection case 26. Since element 6 serves as a drum for the brake 24, it must have a high mechanical strength and therefore its walls are thicker than those of the element 5.

The element 5 and the spokes 3 are integral with a substantially flat annular disc 27 from which they are formed. Disc 27 has an outer edge 28 which is sheared into a plurality of sectors 29 substantially rectangular in shape inasmuch as they extend along a limited arc of circumference. Sectors 29 are alternately bent above and below to opposite sides of the plane containing the disc 27, as shown in FIGS. 2, 3 and 4, and are shaped in such a way as to create a substantially semicircular annular channel coaxial with the element 5 and arranged to receive an annular containment element 30 made of a light material which may even have a rather low mechanical strength, such as for example a synthetic plastic resin. Thus, edge 28 and sectors 29 form an annular element 31 integral with the spokes 3, which together with the containment element 30 forms the rim 2 which therefore exhibits characteristics of considerable sturdiness (ensured by the stamped plate of the element 31) and considerable lightness (due to the element 30 and to the discontinuous structure of the element 31).

As shown in FIG. 1 the spokes 3 are obtained by shearing the disc 27 into four semicircular sectors which leave on the disc 27 itself four shaped cavities 33, and each of said spokes comprises two outer elements 34, symmetrical and parallel to one another, formed by the edges facing the cavities 33 of the remaining portion of the disc 27, and a semi-sheared central element 35 formed by the central portions of the parts of the disc 27 which are situated between the cavities 33. Around these cavities the disc 27 is provided with shaped projections 36 which follow the profile of each cavity 33. The projections 36 are obtained by plastic deformation of a surface 37 of the disc 27, turned towards the mouth of the element 5 which was obtained by deep drawing the center of the disc 27, and therefore said projections 36 result in having their convexity turned towards the bottom wall 8. Said projections 36 serve to stiffen the edge 28 of disc 27 and the elements 34 of the spokes 3.

Referring now also to FIGS. 1, 2, 3, 4, 5, 6 and 7, the disc 27 is provided, near each element 35, with a projection 38 formed by plastic deformation on a surface 39 of the disc 27 opposed to the surface 37 and therefore having its convexity turned in a direction opposed to that of the projections 36. The projections 38 are substantially radial and have a shaped end section 40 facing the edge 28 and forming a semicircular projection 41 on each sector 29 situated in a position corresponding to one of the spokes 3 and bent towards the surface 37. In this way, the elements 35 and the corresponding sectors 29 result in being stiffened and able to withstand high stresses without being deformed. Also all the other sectors 29 are stiffened by means of projections formed in couples on each sector, alternately on the surface 37 or on the surface 39. In particular, all sectors bent towards the surface 37 are stiffened by means of semicircular projections 43 having their convexity turned towards the surface 37 (i.e. obtained by deformation of the surface 39) and radiused to the shaped projection 36 from which they extend in a radial direction, towards the edge 28, with convexity in opposite direction. Each sector 29 bent towards the surface 39 is, instead, stiffened by means of pairs of projections 42 which are equal to the projections 43 but have opposite convexity, i.e. a convexity in accordance with that of the projections 36 to which the projections 42 are radiused. In addition, the sectors 29 disposed side by side with those which bear the projections 41 are provided, in addition to the projection 42, also with a projection 44 which is semicircular in shape and has a convexity in accordance with the projections 42. The projections 44 serve also to stiffen plane terminal sections 45 of the disc 27.

In order to confer a higher stiffness to the spokes 3 the elements 34 of these spokes are bent outside the plane containing the edge 28 so as to result in being oblique relative to the axis of the hub 4; analogously, the semi-sheared central element 35 of each spoke is bent, in a position corresponding to a zone 46 adjacent the sections 40, outside the plane containing the edge 28, with an inclination opposite to that of the elements 34, and a shaped end edge 47 of each element 35 is rigidly fixed to the bottom wall 8, for example by means of welding spots (not shown).

The containment element 30 is annular in shape so as to be adapted to receive the outer cover and respective air tube of a tire (not shown). This element is formed by pressing or die-casting a synthetic plastic resin and is mounted onto the element 31 so as to form the rim 2 by taking advantage of the relatively ample deformability of the plastic materials; to facilitate the mounting, the annular element 30 may be cut at one or more positions and is then welded or glued. Alternatively, it may be molded directly on the already shaped element 31, so as to incorporate the sectors 29, or it may be obtained from a rectilinear channel section made of thermoplastic material which after having been heated to a temperature approaching the softening temperature is bent in a ring-like fashion directly onto the annular element 31, after which the junction zone is welded or glued.

Figure 8:
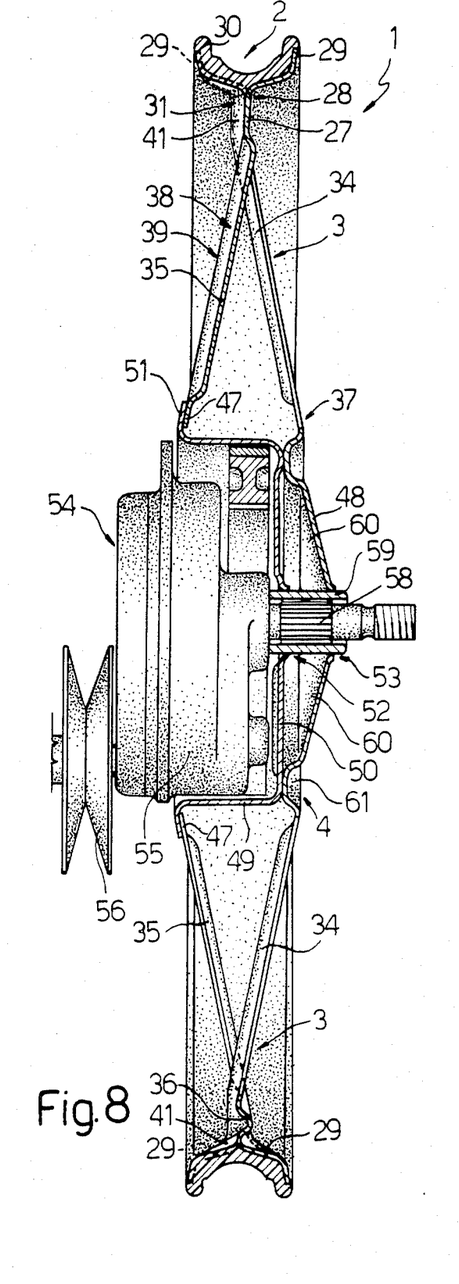
FIG. 8 is a transversal sectional view showing a variant of the wheel of FIG. 1, mounted on a rear hub of a motor-bicycle.

FIG. 8 shows a wheel 1 of a type similar to that of the wheel described hereinabove, from which it differs only as regards the shape and the dimensions of the hub 4. Therefore, similar or equal elements are indicated by the same reference numerals. The hub 4 of the wheel shown in FIG. 8 has a diameter larger than that of the wheel of FIGS. 1 and 2, and the plate from which it is formed by shearing or by pressing may be thicker. The hub 4 comprises a first dish-shaped element 48 obtained by pressing it from the disc 27 in one piece with the spokes 3, and a second cup-shaped element 49 welded to the element 48 in a position corresponding to the bottom wall 50 and welded to the edges 47 of the elements 35 by means of an annular rim 51 formed on the cup-shaped element 49 on the side opposed to the wall 50. In addition, the element 49 is provided with a bore 52 facing a corresponding bore 53 formed in the element 48. Element 49 is adapted to contain the elements of a rear hub 54 of a motor-bicycle, comprising a brake 55 housed inside the body of the cup shaped element 49, a pulley 56 from which it receives the motion and a splined shaft 58 coupled to a splined sleeve 59 housed in the bores 52 and 53. Sleeve 59 is supported by the element 48 by means of projections 60 formed in a symmetrical position on the element 48 and having their convexities turned towards a surface 37 of the disc 27 and being substantially triangular in shape in cross-section and substantially semicircular in plan view. Moreover, a circular channel 61 is formed by pressing around the element 48, so as to radially stiffen element 48. Element 49 serves as a drum for the brake 55, and therefore it must have a high mechanical strength obtained by making the element 49 from a plate having a thickness greater than the thickness of the plate from which the rest of the wheel 1 is made.

Figure 9:
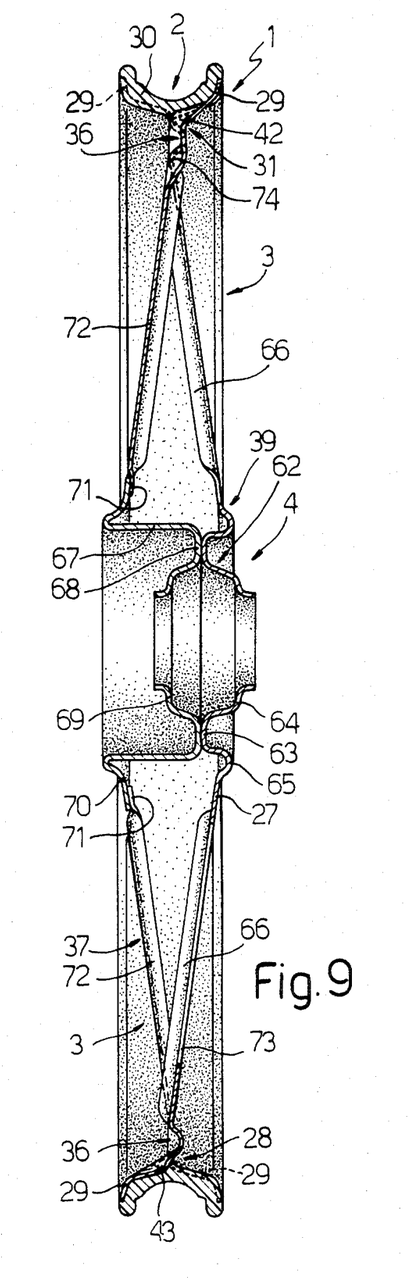
FIG. 9 is a transversal sectional view of a wheel according to a variant of the present invention.
Figures 10, 11, 12, 13:
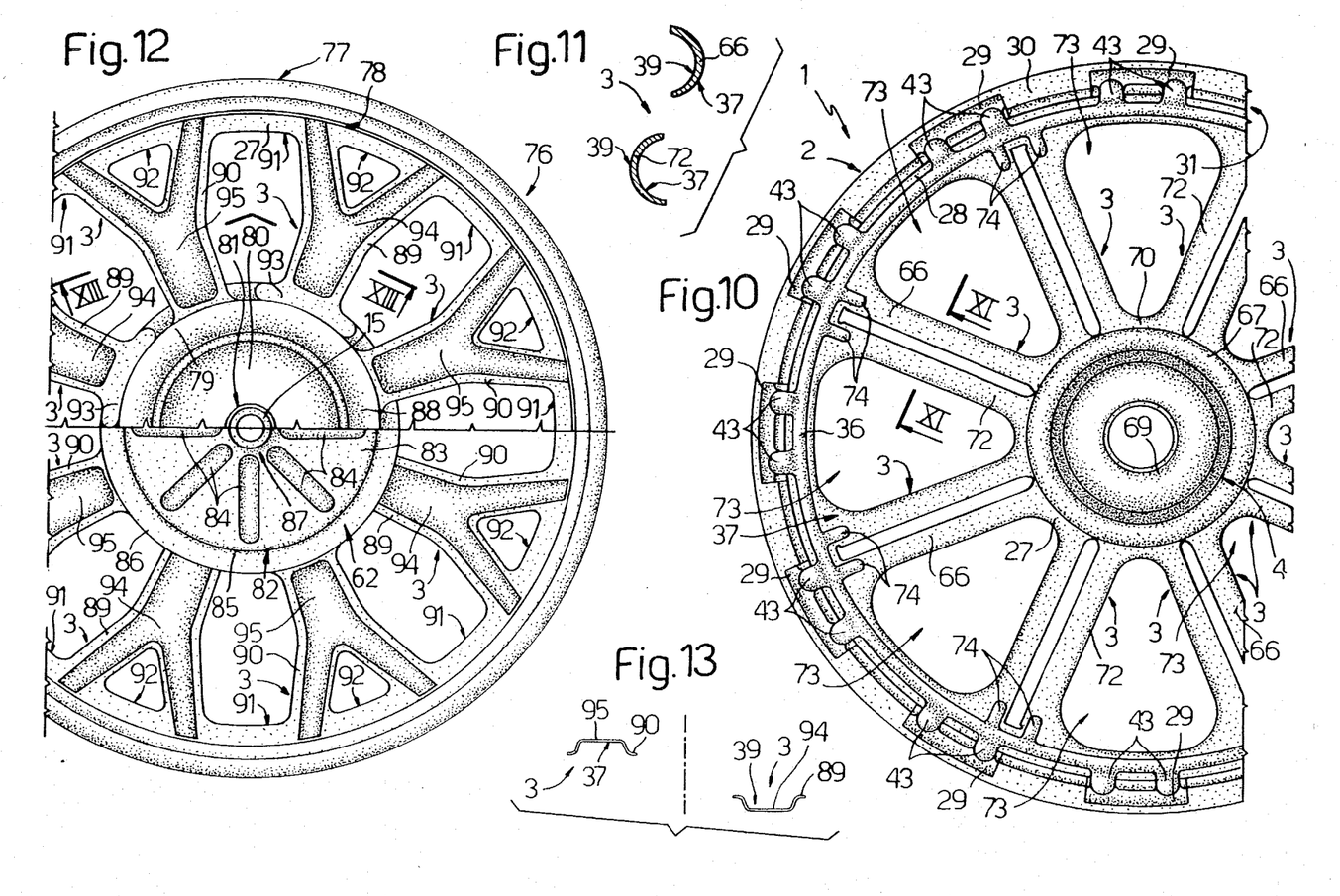
FIG. 10 is a plan view of the wheel of FIG. 9.
FIG. 11 is a section along line XI—XI of the wheel of FIG. 10.
FIG. 12 shows in a first half a plan view of a wheel according to a further variant of the present invention and in the second half a plan view of the same wheel turned by 180°.
FIG. 13 is a section along line XIII—XIII of the wheel if FIG. 12.

FIGS. 9 and 10 show a variant of the wheel 1 described hereinabove, in which the already described parts are indicated by the same reference numerals. The rim 2 is completely similar to that of the embodiment shown in FIGS. 1 and 8 and comprises a containment element 30 and an element 31 formed by the edge 28 of the disc 27, provided with sectors 29 bent and sheared and having projections 42 and 43, stiffened by means of an annular projection 36 formed on a surface 37 of the disc 27 and whose convexity accordingly is turned towards the opposed surface 39. Formed in one piece with the disc 27 are the spokes 3 and a hub member 62 which is cup-shaped and on a bottom wall 63 of which there is formed integral therewith a shaped sleeve 64 extending inside the cup-shaped member 62 towards the surface 39. Finally, hub member 62 has an annular convex stiffening edge 65, integral with which are oblique elements 66 of the spokes 3. Hub 4 is completed by a second cup-shaped element 67 having a bottom wall 68 mounted against the wall 63 to which it is connected by welding and provided with a shaped sleeve 69 which is symmetrical to the sleeve 64, to the respective face of which it is joined, and which extends in a direction opposite to that of the sleeve 64. In addition, the cup-shaped element 67 has an annular rim 70 to which there are welded the ends 71 of oblique elements 72 of the spokes 3 having an inclination in a direction opposite that of the elements 66. In addition, the cup-shaped element 67 is arranged to contain a brake (not shown) for the wheel 1, for which it is adapted to serve as a drum, since it has a thickness greater than that of the plate from which the rest of the wheel 1 is formed.

Each spoke 3 is formed by the edges of elements 66 and 72 obtained by semi-shearing them from the disc 27 and bending them alternatively toward opposite sides of the plane containing the edge 28; in each of said elements 66 and 72 there being formed a lightening cavity 73. In addition, elements 66 and 72 are pressed in such a way as to result in having a convex profile (FIG. 11) with the convexity turned towards the surface 37 (for the elements 66) and towards the surface 39 (for the elements 72), respectively, so as to stiffen them. Each of them is provided is provided with projections 74 for connection with the edge 28.

FIGS. 12 and 13 show a modified embodiment 76 of the wheel 1 shown in FIGS. 9 and 10. Parts similar or equal to those described already, are indicated by the same reference numerals. The wheel 76 shown in FIGS. 12 and 13 differs from the wheel shown in FIGS. 9 and 10 mainly by the configuration of the spokes 3 and by the structure of the rim which is designed to have a load bearing function. In particular, the wheel 76 comprises a plane disc 27 made of sheared and pressed plate, and a load bearing rim 77 preferably made of sheared and rolled plate and rigidly fixed to an outer edge 78 of the disc 27 by means of welding spots or by any other suitable means, for example by riveting. The rim 77 is annular in shape and is adapted to serve as a containment element for a tire with its air tube. It may be formed in one piece which is then joined to the disc 27, or it may be formed partly integral with the disc 27 by pressing and bending the edge 78 of the said disc 27 outside the plane which contains it. In this second case, the rim 77 comprises the edge 78 and a symmetrical element, not shown, mounted to the face of the edge 78 and rigidly connected to the disc 27.

Formed integral with the disc 27 are the spokes 3 and a hub member 62 similar to that of the wheel 1 shown in FIG. 12 and shaped like a cup and delimited by a conical side wall 79 and by a bottom wall 80, also conical in shape, provided with a central bore 81. The hub 4 is completed by a second cup-shaped element 82 having a bottom wall 83, substantially planar and provided with a plurality of radial crownings 84, and a cylindrical sidewall 85 provided with an edge bent externally. Wall 83 is provided with a bore 87 coaxial to the bore 81, and is welded, or joined in any other suitable manner, to a planar annular portion 88 of the disc 27, which encloses the hub element 62. Within the bores 81 and 87 there may be housed a sleeve 15 for mounting the wheel 76 on the respective vehicle.

The spokes 3 are substantially Y-shaped and formed by planar portions 89 and 90 of the disc 27 which are delimited by a plurality of cavities 91 shaped substantially like irregular hexagons, and cavities 92 substantially triangular in shape, formed by shearing them from the disc 27. Portions 89 and 90 are bent outside the plane containing the disc 27, toward opposite sides of the plane of the disc, respectively, so as to result in being oblique relative to the axis of the wheel 76 and divergent towards the axis itself. In this way, each portion 89 has an end 93 which comes to rest against the bent edge 86, to which it is rigidly connected, for example, by welding. Portions 90, instead, result in being directly attached to the annular portion 88 of the disc 27, which portion therefore is disposed outside the plane containing the disc 27 and is parallel to the plane.

Finally, the spokes 3 (FIG. 13) comprise respective projections 94 and 95 for stiffening the portions 89 and 90, respectively, formed on the opposite surfaces 39 and 37 of the disc 27, respectively, and whose convexity therefore results in being turned towards the surfaces 37 and 39, respectively, so that the spokes 3 result in being symmetrical both towards the surface 37 and towards the surface 39.

Figures 14, 15, 16:
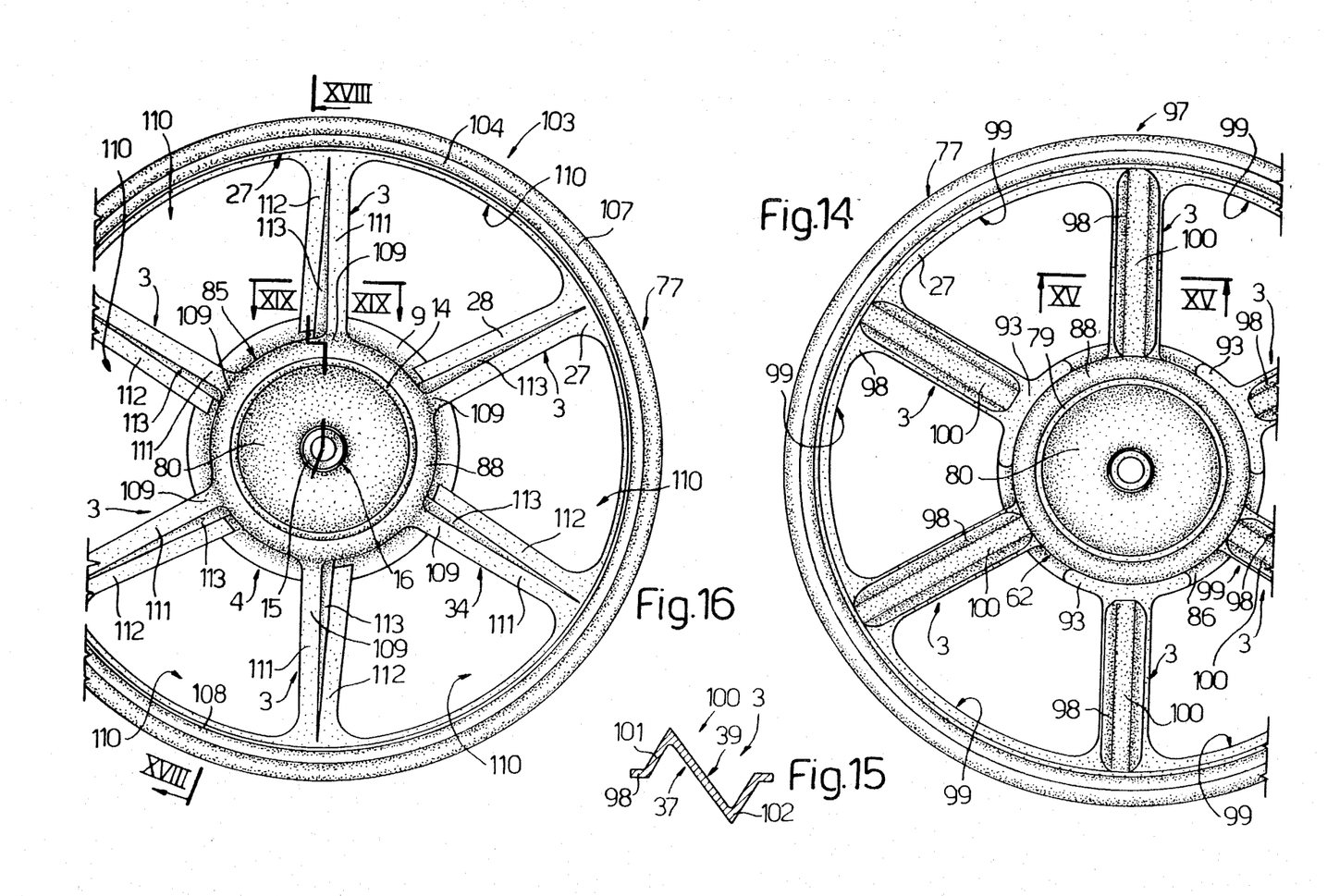
FIG. 14 shows a further variant of the present invention.
FIG. 15 is a section along line XV—XV of the wheel of FIG. 14.
FIG. 16 is a plan view of a wheel for motor-bicycles according to a further variant of the present invention.
Figure 17:
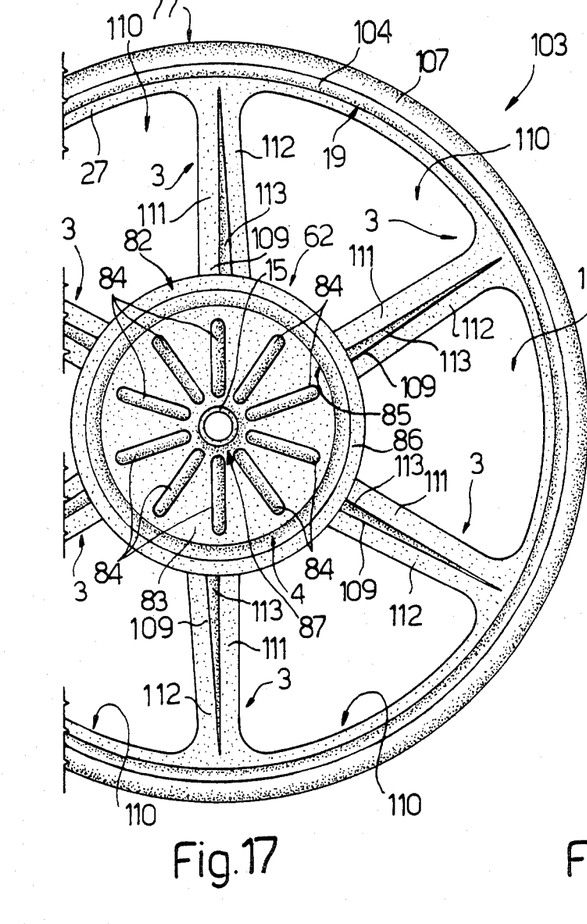
FIG. 17 shows a portion of a view of the opposite side of the wheel of FIG. 16.
Figure 18:
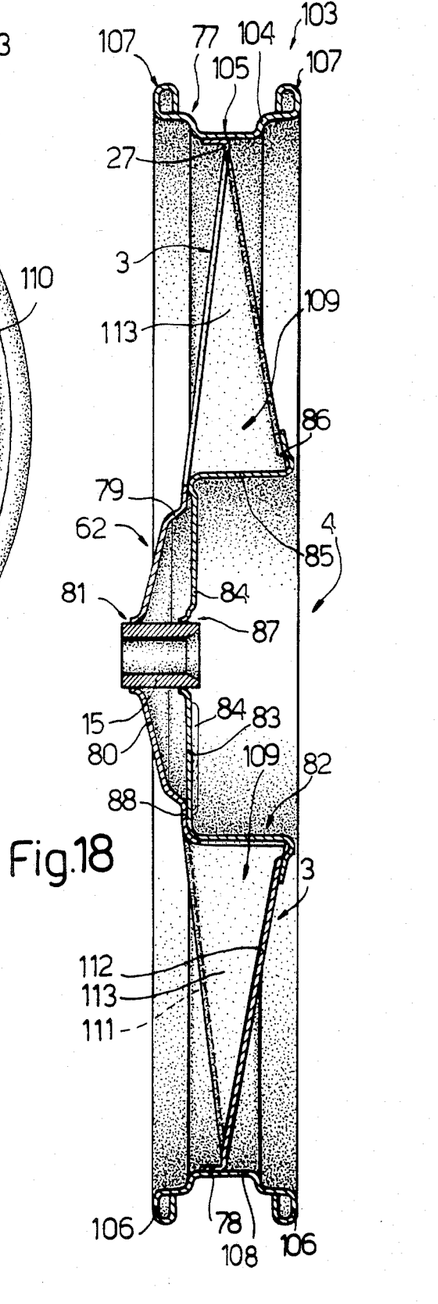
FIGS. 18 and 19 are sections along lines XVIII—XVIII and XIX—XIX, respectively, of the wheel of FIG. 16.

FIG. 14 shows a wheel 97 which differs from the wheel shown in FIG. 12 only as regards the shape of the spokes 3, whose cross-section is shown in FIG. 15. The parts similar or equal to those already described hereinabove are indicated by the same reference numerals. In particular, the wheel 97 comprises a load bearing rim 77 fixed to a planar disc 27, integral with which are formed the spokes 3 and a hub member completely equal to that of the wheel 76. Referring to FIGS. 14 and 15, the spokes 3 of the wheel 96 are formed by rectangular portions 98 of the disc 27 which are delimited by triangular cavities 99 sheared in the disc 27. The portions 98 are alternatively bent toward opposite side of the plane containing the disc 27, analogously to the portions 89 and 90, and are provided with a longitudinal stiffening rib 100 (FIG. 15) comprising two projections 101 and 102 which are parallel and formed on the opposite surfaces 37 and 39 of the disc 27, so that each rib 100 and each spoke 3 result in being symmetrical both towards the surface 37 and towards the surface 39. The projections 101 and 102 are substantially triangular in section.

Figure 19:
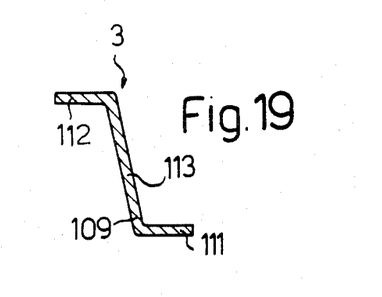

FIGS. 16, 17, 18 and 19 show a wheel 103 which represents a further variant of the wheel 76 shown in FIG. 12. In particular, the wheel 103 differs from the wheel 76 as regards the configuration and shaping of the spokes 3 whose cross-section is shown in FIG. 19. Parts similar or equal to those already described are indicated by the same reference numerals. The wheel 103 comprises a load bearing rim 77 fixed to a planar disc 27, integral with which are formed the spokes 3 and a hub member 62 identical to that of the wheel 76, joined, in the way described hereinabove, to a second cup-shaped element 82 forming with it the hub 4 of the wheel 103. The rim 77 and the planar disc 27 are made of a plate of steel or of a light alloy, such as aluminum, of suitable thickness. The rim 77 is fixed in any suitable manner, for example by welding, to an outer annular edge of the disc 27 and comprises a sleeve 104 which is substantially cylindrical in shape and coaxial with the hub 4 and is made of a plate sheared and bent, for example by rolling, so as to make it assume an annular shape. The sleeve 104 has a central annular groove 105 arranged to receive the tire with the respective air tube, and two end edges 106, opposite to one another, bent so as to form two annular shoulders 107 coaxial to the sleeve 104 and adapted to retain laterally the tire. The edge 78 is bent at a right angle relative to the plane containing the disc 27, in a direction parallel to the axis of the wheel 103, so as to result in being coaxial to the rim 77, which has also a radial bore 108 for the passage of the air tube valve. In a variant not shown, the load bearing rim 77 is formed by molding it from one piece of plastic material. In this case, the rim 3 is molded directly onto the edge 78 bent at a right angle, so as to incorporate this latter, which in this way, in addition to connecting the rim 77 to the disc 27, acts also as a loading bearing structure for the rim 77.

Each stroke 3 comprises semi-sheared elements 109 bent toward opposite sides of the plane containing the disc 27, so as to result in being disposed transversally with respect to the plane containing the disc 27. The elements 109 are at the same time connected to both cup-shaped elements 62 and 82 of the hub 4, inasmuch as they are formed integral with the element 62 and are fixed in any suitable manner, preferably by welding, to the sidewall 85 of the element 82 and to the edge 86.

Each semi-sheared element 109 is substantially planar, and in plan view it is shaped substantially like a isosceles trapezoid, it being delimited by substantially triangular radial cavities 110 formed by shearing the disc 27. Each element 109 has three portions 111, 112 and 113, which are bent outside the plane containing 27, in such a way that each spoke 3 (FIG. 12) has radial sections, relative to the axis of the wheel 103, which are tapered towards the rim 27 and have substantially the shape of a Z-shaped structure oriented in a direction parallel to the axis of the wheel 103.

In particular, elements 109 have two planar lateral portions 111 and 112, opposed to one another, bent above and below the plane containing the disc 27, respectively, so as to result in being oblique and divergent relative to the axis of the wheel 103, and a central portion 113 which connects the lateral portions 111 and 112 to one another and is bent transversely to the plane containing the disc 27. In order to allow such bending, each element 109 is semi-sheared from the radially innermost portion 88 of the disc 27, in such a way that only the portion 111 results in being directly attached in one piece, without any gap, to the hub element 62, while the portions 112 and 113, though being integral with the portion 111 and, hence, with the element 62, have been separated by shearing from the latter and result in being fixed, the portion 112 to the edge 86, and the portion 113 to the wall 85 of the element 82. The portions 111, 112 and 113 are all connected in one piece, without gap, at the outer annular edge 78 of the disc 27.

In this way, each spoke 3 has a high stiffness, inasmuch as it is formed by a three element structure comprising two flange members (portions 111 and 112) connected to one another by a transversal core (portion 113), i.e. equivalent to an I-beam which, as is known, with equal resistant section and, hence, equal weight, exhibits the highest stiffness and strength. Furthermore, the spokes 3 of the wheel 103, as compared to the spokes 3 of the wheel 1, have a decidedly better aesthetic appearance, inasmuch as they result in being symmetrical from any side they may be looked at.

The advantages of the present invention are clearly apparent from the foregoing description. In particular, the main load bearing part of the wheel (hub and spokes) can be formed by a single pressing operation of a single element made of plate, instead of the pressing and coupling of two different elements, so as to have reduced flash and reduced costs of production and simple working operations. The hub containment element can have a load bearing function and be formed partly in one piece with the remaining part of the wheel, with low costs without altering the reliability of the wheel.

Thus, a wheel is obtained whose costs of production and weights are intermediate between those of the known wheels with spokes and the light alloy die-cast wheels, and which has high reliability, and which, as compared to the known wheels made of plate, has much lighter weight, reduced scrap and requires a smaller number of operations and allows the use of simple junctions. In particular, the rim with discontinuous load bearing elements formed by sectors allows a great saving of material as compared with the rolled rims, not only by virtue of the reduced scrap, but also because less starting material is required; therefore it is possible to use lighter and dimensionally reduced plate, thereby obtaining lighter wheels which however have equal strength. Finally, the hub made of two elements renders it possible for the inserted cup-shaped element to assume much of the load bearing functions and to serve as a drum for the brake and allows the use for the remaining part of the hub and, consequently, for the entire wheel, of a plate having a small thickness and therefore a lightweight, which would be impossible if the element intended to serve as a drum for the brake was formed integral with the wheel. Thus, the wheel according to the present invention is light, has a high strength and is obtainable by a single pressing and shearing operation followed by a bending operation and by a third operation of fixing the separate pieces of the rim and the hub.

From the foregoing it is clearly apparent that modifications and variations can be made to the wheel according to the present invention, without departing from the scope of the invention. In particular, the element 30 can be made hollow with suitable stiffening ribs disposed in a reticular configuration or it can be made by pressing of aluminum plate or of materials other than plastics.

Furthermore, in the inner surface of the annular element 30 there may be formed cavities at alternate positions, arranged to be coupled to the sectors 29 by snap-connection or by mating. In this case, the element 30 is obtained by bending around the element 31 a rectilinear and flexible section having the said cavities formed therein.

I claim:

1. A wheel for a land vehicle comprising:
   a central hub;
   a substantially circular disc sheared and bent to integrally form a cup-shaped hub retainer element, a plurality of spokes radially extending from said hub retainer element, and an outer annular edge connecting said spokes, said outer edge sheared into a plurality of sectors bent alternatively above and below the plane of said outer edge whereby said outer edge forms an annular channel coaxial with said central hub; and
   an annular rim element secured to said annular channel.

2. A wheel as defined in claim 1 wherein said annular rim element is formed by molding a synthetic plastic resin directly onto said annular channel and wherein said plastic rim element is incorporated into said sectors of said outer edge.

3. A wheel as defined in claim 1 wherein said annular rim element is made of a thermoplastic resin and is sectionally secured to said annular channel.

4. A wheel as defined in claim 3 wherein said annular rim element is provided with cavities arranged to integrate with said sectors of said outer edge.

5. A wheel as defined in claim 1 wherein said sectors are provided with radial stiffening projections.

6. A wheel as defined in claim 5 wherein said outer edge has at least one stiffening projection disposed substantially along the plane of said outer edge.

7. A wheel as defined in claim 1 further comprising an annular drum member secured to said annular disc coaxial with said hub retainer element and further retaining said central hub.

8. A wheel as defined in claim 7 wherein said drum member retains braking means for the wheel.

9. A wheel as defined in claim 7 wherein said spokes form a substantially Z-shaped cross-section comprising parallel upper and lower portions and an oblique central portion connecting said upper and lower portions.

10. A wheel as defined in claim 9 wherein said lower portion of said spoke is integrally formed with said cup-shaped hub retainer element and wherein said upper portion is secured to said drum member.

* * * * *

UNITED STATES PATENT AND TRADEMARK OFFICE
CERTIFICATE OF CORRECTION

PATENT NO. : 4,523,790
DATED : June 18, 1985
INVENTOR(S) : Lauro Mariani

It is certified that error appears in the above-identified patent and that said Letters Patent is hereby corrected as shown below:

Column 3, line 47 after "cavities" insert --33--.

Column 5, line 57 delete "is provided" (first occurrence)

Column 6, line 61 delete "96" insert --97--.

Column 7, line 41 delete "stroke" insert --spoke--.

Column 8, line 7 delete "the" insert --this--.

Signed and Sealed this

Twenty-fourth Day of December 1985

[SEAL]

Attest:

DONALD J. QUIGG

Attesting Officer

Commissioner of Patents and Trademarks